(12) United States Patent
Li et al.

(10) Patent No.: US 11,881,727 B2
(45) Date of Patent: Jan. 23, 2024

(54) COMMUNICATION PAIRING FOR TELEPHONE BASED ON WIRELESS CHARGING PROTOCOL

(71) Applicant: Cisco Technology, Inc., San Jose, CA (US)

(72) Inventors: Zhaozhuo Li, Shanghai (CN); Jianhua Jiang, Shanghai (CN); Yikai Lin, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 378 days.

(21) Appl. No.: 17/197,662

(22) Filed: Mar. 10, 2021

(65) Prior Publication Data
US 2022/0294271 A1    Sep. 15, 2022

(51) Int. Cl.
*H02J 50/80* (2016.01)
*H02J 7/00* (2006.01)
*H04R 1/10* (2006.01)
*H02J 50/10* (2016.01)

(52) U.S. Cl.
CPC .......... *H02J 50/80* (2016.02); *H02J 7/00034* (2020.01); *H02J 7/00045* (2020.01); *H04R 1/1025* (2013.01); *H02J 50/10* (2016.02); *H02J 2310/22* (2020.01)

(58) Field of Classification Search
None
See application file for complete search history.

(56) References Cited

U.S. PATENT DOCUMENTS

| | | | |
|---|---|---|---|
| 8,805,456 B1 * | 8/2014 | Hardy | H04M 1/72412 455/41.1 |
| 10,658,881 B2 * | 5/2020 | Hamaguchi | H02J 50/12 |
| 2011/0028091 A1 | 2/2011 | Higgins et al. | |
| 2011/0205944 A1 | 8/2011 | Miyabayashi et al. | |
| 2013/0257365 A1 * | 10/2013 | Redding | H02J 50/40 320/108 |
| 2015/0006395 A1 | 1/2015 | Chu | |
| 2016/0050563 A1 * | 2/2016 | Bronk | H04L 63/062 726/7 |

(Continued)

FOREIGN PATENT DOCUMENTS

CN   109905869 A   6/2019
WO   2013104153 A1   7/2013

OTHER PUBLICATIONS

Harry Guinness, "What Is Apple's W1 Chip?", How-To Geek, Jan. 24, 2018, 4 pages.

(Continued)

*Primary Examiner* — Richard Isla
*Assistant Examiner* — Javier A. Bernal Sosa
(74) *Attorney, Agent, or Firm* — Edell, Shapiro & Finnan, LLC

(57) ABSTRACT

A method of establishing a secure wireless communication pairing using a wireless charging for authentication via an out-of-band channel. The method includes a telephone base detecting presence of a wireless handset and initiating a wireless charging process to charge the wireless handset upon detecting the presence of the wireless handset. The method further includes establishing a secure wireless communication pairing by telephone base with the wireless handset, based on information exchanged as part of the wireless charging process.

20 Claims, 6 Drawing Sheets

(56) References Cited

U.S. PATENT DOCUMENTS

| | | |
|---|---|---|
| 2017/0104355 A1 | 4/2017 | Barmoav et al. |
| 2017/0237301 A1 | 8/2017 | Elad et al. |
| 2018/0241564 A1 | 8/2018 | Peterson |
| 2018/0287668 A1 | 10/2018 | Pifferi |
| 2018/0295491 A1 | 10/2018 | Ling et al. |
| 2019/0281147 A1* | 9/2019 | Sherburne ............. H02J 7/0042 |
| 2023/0084679 A1* | 3/2023 | Lee ......................... H02J 50/10 |
| | | 320/108 |

OTHER PUBLICATIONS

International Search Report and Written Opinion in counterpart International Application No. PCT/US2022/018620, dated May 19, 2022, 15 pages.

* cited by examiner

COMMUNICATION PAIRING FOR TELEPHONE BASED ON WIRELESS CHARGING PROTOCOL

TECHNICAL FIELD

The present disclosure relates to telephone devices.

BACKGROUND

A recent trend to improve consumer convenience in electronic devices is to redesign wired devices to become wireless. Desktop telephones are no exception to this trend. Moreover, wireless charging is a recently developed technology that is being deployed to facilitate charging of devices without requiring a physical electrical connection.

DESCRIPTION OF EXAMPLE EMBODIMENTS

Overview

Figure 1B:
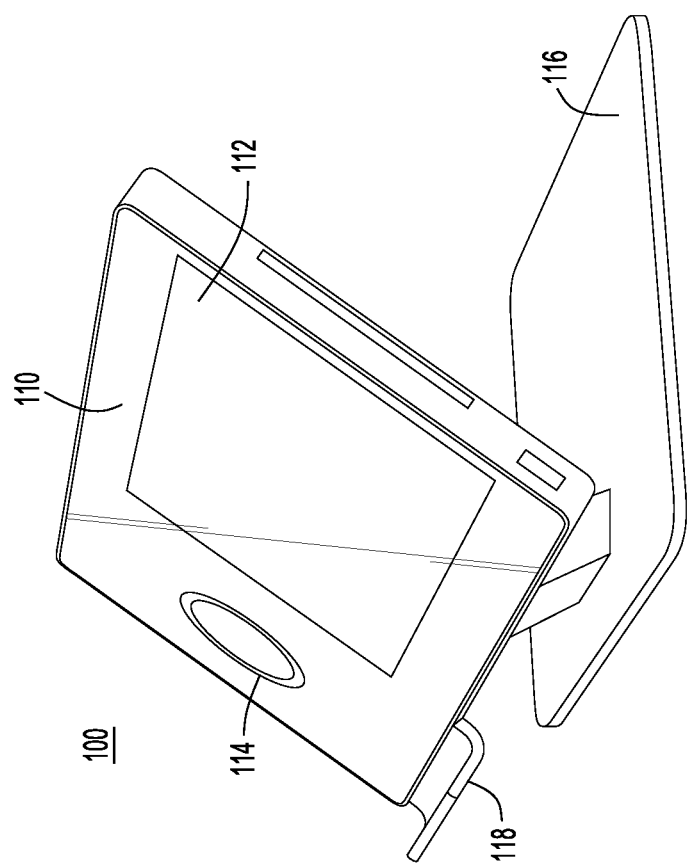
FIG. 1B is a diagram of the telephone base of the desktop telephone apparatus shown in FIG. 1A, but with the wireless handset removed from the wireless charging position on the telephone base.

Briefly, in one embodiment, methods are presented for providing telephone devices with a secure wireless communication pairing functionality when a wireless handset is charged by a telephone base using a wireless charging protocol. A telephone base detects presence of a wireless handset and initiates a wireless charging process to charge the wireless handset upon detecting the presence of the wireless handset. The telephone base establishes a secure wireless communication pairing with the wireless handset based on information exchanged as part of the wireless charging process.

Example Embodiments

Desktop telephones are widely used. Existing desktop telephones include a handset and a telephone base that may be connected only wirelessly. Accordingly, communication and charging needs to be wireless. For communication, the handset and the telephone base may use short-distance wireless communication such as Bluetooth® wireless communication protocol. To establish a wireless communication channel, the handset and the telephone base need to be paired. Current pairing techniques may take a long time and are inconvenient for the user.

As an example, to pair the handset to the telephone base of a desktop telephone using the Bluetooth protocol, the following operations need to be performed. First, the user needs to press a Bluetooth button on the handset to initiate the pairing process by broadcasting Bluetooth identification information such as Media Access Control (MAC) address of the handset. Second, the Bluetooth "visibility" needs to be open on the telephone base, which then searches for active Bluetooth devices. Third, the handset needs to be selected using a user interface (UI) on the telephone base. Additionally, the user may need to press connect or some other button on the telephone base to confirm connection. Sometimes, the user may also need to receive a Personal Identification Number (PIN) code provided from the handset and input the PIN code using the UI on the telephone base to establish the communication connection.

As such, this pairing mechanism is timely and not user-friendly. Further, the user may miss an incoming call during this pairing process, which is frustrating for the user. Another disadvantage of this technique is that it is not secure because the telephone base and the handset are exposed to attacks. That is, one component (the handset) is broadcasting its sensitive information (Bluetooth MAC address or etc.) and the other component (telephone base) is opening itself for searching and pairing with every active Bluetooth device in the vicinity. It is easy to trigger an eavesdropping attack and man-in-the-middle (MITM) attack during this pairing process, which may cause data loss and unwanted outcomes. In order to address the security aspect of this pairing mechanism, Secure Simple Pairing (SSP) defined in the Bluetooth Specification may be used. The SSP provides a secure pairing process in a simpler manner from the user's perspective but it is still a timely process. For example, Bluetooth SSP includes the following stages:

(1) Input Output Capabilities Exchange Stage: The devices to be paired (handset and the telephone base) exchange pairing mechanism(s) that it supports and other pairing related information that include features and parameters. The pairing features exchanged determines which authentication method will be used in Stage 3 of this process. For example, the handset may indicate that it supports an Out-of-Band (OOB) mechanism for the secure pairing.

(2) Public Key Exchange Stage: The devices exchange keys to be used in the established wireless communication. This stage could be completed together with Stage 3, as defined in the Bluetooth Core Specification.

(3) Authentication Stage I—Stage 3 of the SSP: The user is required to perform some operations. Based on the capabilities exchanged during Stage 1 (Input Output Capabilities Exchange stage), one or more of the following techniques may be performed:

(a) First technique involving a numeric comparison authentication useful for scenarios where both devices are configured to display an alphanumeric code for authentication (e.g., a six digit number) and both are configured to receive the user input confirmation (e.g., enter "yes" or "no"). That is, the user is provided with a code, such as a 6-digit code as an example, on both displays and then asked whether the numbers are the same on both devices. If confirmed on both devices, then the pairing is successful.

(b) Second technique involving passkey entry useful for scenarios where one device has input capability but does not have the code display capability. In this technique, a first device with output capabilities provides the user with a code for the authentication, then the user is required to enter this code on a second device that lacks output capabilities. If the value entered matches the value displayed then pairing is successful.

(c) Third technique that is an OOB technique useful for scenarios in which two devices exchange authentication data over an OOB channel based on an OOB mechanism.

All of these techniques simplify the pairing process while providing some added security. In the first two techniques, however, there are still a number of operations that the user needs to perform. Also, the first two techniques are subject to man-in-the-middle attacks.

The third technique requires an OOB channel, which is typically a near field communication (NFC) channel. Specifically, after Stages 1 and 2 are completed, the NFC is then used for communicating authentication data, such as the Bluetooth MAC address and cryptographic information such as a random value r generated by each device. For this NFC communication, one device has an NFC tag and is in proximity of another device with an NFC reader.

(4) Authentication Stage II—Stage 4 of SSP: The two devices being paired compute one or more check values and confirm authentication. That is, the two devices confirm that the exchange in the first authentication state (SSP Stage 3) was successfully completed.

(5) Link Key Calculation Stage: The two devices generate a link key that may be computed using a shared key and publicly exchanged data.

(6) Link Manager Protocol (LMP) Authentication and Encryption Stage: Encryption keys are generated and the devices are successfully and securely paired or connected.

Desktop telephones are typically not equipped with NFC capabilities/functionality. It would be costly and timely to add the NFC capability strictly for pairing the handset to the telephone base. As such, desktop telephones cannot use an OOB channel authentication technique in SSP Stage 3 (Authentication Stage I).

In one or more example embodiments, however, an information communication interface of a wireless charging system is enabled to serve as the OOB channel for fast and secure pairing of the handset to the telephone base. That is, the components of the telephone base that wirelessly charge the handset are also configured to assist in securely pairing the telephone base with the handset for wireless communication by providing the OOB channel for fast and secure pairing.

The telephone base may charge one or more batteries in the wireless handset according to a wireless charging protocol, such as the Wireless Power Consortium (WPC) Qi Protocol (version 1.2.4). The data communication channel of the wireless charging protocol is used as the OOB channel. Accordingly, the desktop telephone does not need NFC capability, thereby improving the design, decreasing complexity, and reducing cost of the desktop telephone. The desktop telephone does not include any additional circuitry or sensors to provide the OOB channel nor the inconveniences associated with the first two authentication techniques described in Stage 3 (Authentication Stage 1) of the SSP. Since no additional components are required for the techniques presented herein, power that the additional components would otherwise consume is avoided.

The techniques presented below are not limited to a desktop telephone and are applicable to any telephones that have a telephone base and a wireless handset.

Figure 1A:
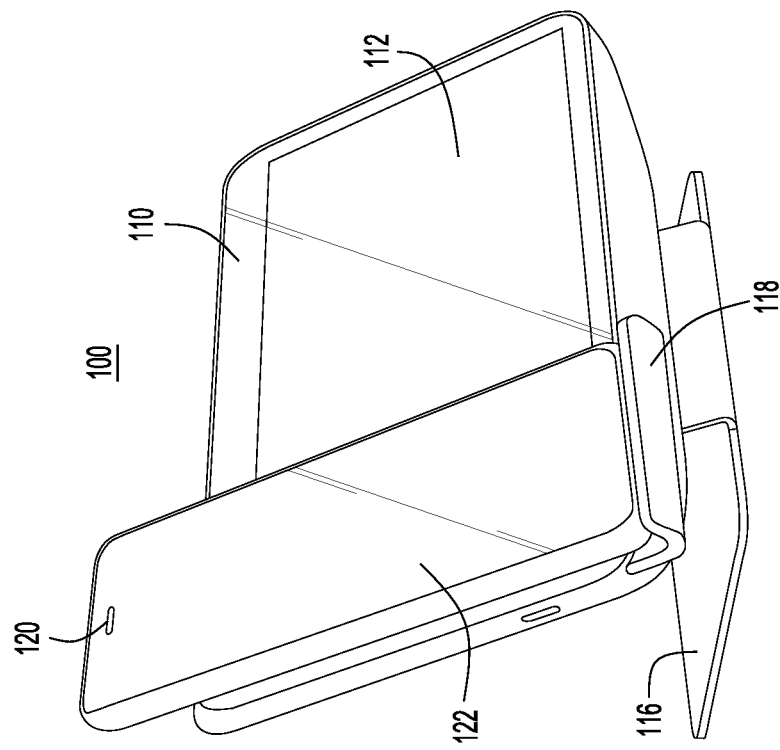
FIG. 1A is a diagram illustrating a desktop telephone apparatus including a telephone base and a wireless handset, where the telephone base and wireless handset are configured to permit wireless charging of the wireless handset and to perform secure pairing of the wireless handset to the telephone base, according to the techniques presented herein.

Reference is now made to FIGS. 1A and 1B that illustrate a desktop telephone 100, according to an example embodiment. The desktop telephone 100 includes a telephone base 110 and a wireless handset 120. The telephone base 110 has a flat front surface with a base touch screen display 112, a charging position 114, a base stand 116, and a wireless handset holder 118. The wireless handset 120 includes a handset touch screen display 122.

In FIG. 1A, the wireless handset 120 is placed in the charging position 114 that is on a flat surface of a housing of the telephone base 110. In the charging position 114, the wireless handset 120 rests on the wireless handset holder 118 abutting an interface surface that is proximate to charging components. In this arrangement, the telephone base 110 can wirelessly charge the wireless handset 120.

FIG. 1B shows the desktop telephone 100 with the wireless handset 120 removed from the charging position 114. The wireless handset 120 is in short-range communication distance of the telephone base 110 to receive or place calls when it is removed from the charging position 114, and even when it is placed in the charging position 114.

It is to be understood that the appearance and mechanical design of the desktop telephone 100 shown in FIGS. 1A and 1B is not meant to be limiting. There are numerous other ways to support the wireless handset 120 on the telephone base 110 so that the wireless handset 120 can be wirelessly charged by the telephone base 110. Moreover, the telephone base 110 need not have a smooth and flat display such as the base touch screen display 112. The display on the telephone base 110 may take on many different forms. Moreover, there may be a mechanical keypad and other mechanical buttons on the face of the telephone base 110. Further still, the telephone base 110 may have a camera to facilitate video communication.

Various internal components of the desktop telephone 100, according to an example embodiment, are now described with reference to FIG. 2. The desktop telephone 100 may be configured to implement Voice over Internet Protocol (VoIP) techniques for conducting telephone calls over an IP network. In another form, the desktop telephone 100 may be configured to conduct telephone calls in a more conventional manner directly over a public switched telephone network (PSTN).

The telephone base 110 includes a base system 130 and a power transmitter 150. The base system 130 includes a base central processing unit (CPU) 132, a base memory 134, a network interface card 136, VoIP telephony card(s) 138 (which may take the form of one or more Application Specific Integrated Circuits (ASICs)), the base touch screen display 112, and a power supply 142. A bus (not shown) may be provided to enable communication between the base CPU 132 and the other components. The bus may be implemented with any architecture designed for passing data and/or control information between the base CPU 132 and other components.

The base memory 134 may include persistent storage. In one example embodiment, the base memory 134 includes a random access memory (RAM) and a cache memory. In general, the base memory 134 can include any suitable volatile or non-volatile computer readable storage media. The base memory 134 may be a solid state hard drive, a semiconductor storage device, or any other computer readable storage media that is capable of storing program instructions or digital information. Instructions for control logic may be stored in the base memory 134 for execution by the base CPU 132. The control logic may include one or more programs stored in the base memory 134 for execution by the base CPU 132.

For example, the control logic stored in base memory 134 includes instructions that, when executed by the base CPU 132, cause the telephone base 110 to perform various control functions for the telephone base, such as connecting/disconnecting the phone call when the hook status changes and securing pairing the telephone base 110 to the wireless handset 120. Also, the control logic includes instructions, that when executed by the base CPU 132 cause the telephone base 110 to manage the transmission and reception of voice signals and handle other telephone functionality.

The network interface card 136 provides for data network communication with other systems or devices. In these examples, the network interface card 136 may provide network communications through the use of either or both physical and wireless communications links. The network interface card 136 connects the telephone base 110 to a communication network, via a router or gateway, to enable connectivity to a local access network (LAN) which in turn is connected to a public network (wide area network) such as the Internet.

The VoIP telephony card(s) 138 are hardware component(s) that perform network telephony, including conversion digital-to-analog conversion and analog-to-digital conversion of audio, packetizing of digital audio into data packets, as well as other VoIP telephone functions.

The base touch screen display 112 is an input/output interface that allows for touch-based input of controls as well as to display information to a user. The base touch screen display 112 may provide data input by the user to the base CPU 132 e.g., in order to call a number or may output (display) an instruction or data received from the base CPU 132 e.g., there is an incoming call.

The base wireless transceiver 140 facilitates wireless communication with the wireless handset 120 according to a short-range wireless communication protocol such as, but not limit to, the Bluetooth wireless protocol. The base wireless transceiver 140 may provide voice data received during a telephone call to the wireless handset 120 as well as receive voice data from the wireless handset 120 during a telephone call. Moreover, the base wireless transceiver 140 exchanges with the wireless handset 120 control signals determined by control logic, such as to information required for securely pairing with the wireless handset 120 and information required for switching calls between off-hook status and on-hook status.

The power supply 142 is connected to an external power source, such as an electrical outlet (not shown), and supplies electrical power to the components of the telephone base 110, including electrical power to the various components of the base system 130 as well as electrical power to the power transmitter 150. The power supply 142 supplies power to a charging coil 152 of the power transmitter 150.

The power transmitter 150 charges the wireless handset 120 using the charging coil 152. Moreover, the power transmitter 150 detects the presence and absence of the wireless handset 120 in the charging position 114 of the telephone base based on signaling performed as part of a wireless charging protocol, and notifies the base CPU 132. The power transmitter 150 also exchanges with the wireless handset 120 at least some of the information required for the secure pairing in signaling performed as part of the wireless charging protocol.

Figure 2:
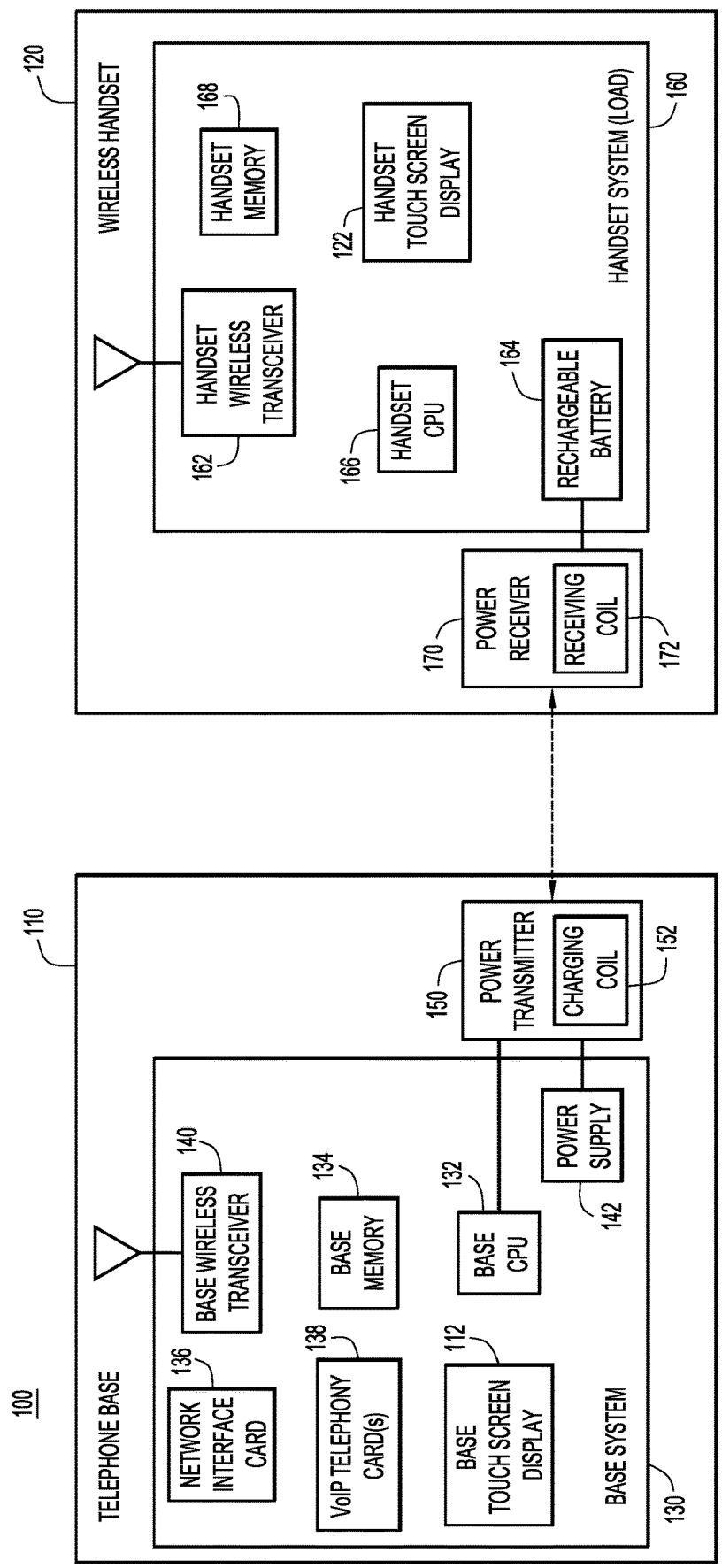
FIG. 2 is a block diagram illustrating various components of telephone base and wireless handset that enable wireless charging and secure pairing, according to an example embodiment.

As shown in FIG. 2, the wireless handset 120 includes a handset system 160 and a power receiver 170. The handset system 160 includes a handset wireless transceiver 162, a rechargeable battery 164, a handset CPU 166, a handset memory 168, and the handset touch screen display 122. The power receiver 170 includes a receiving coil 172. The handset system 160 acts as a load with respect to the power receiver 170.

The receiving coil 172 receives power from the charging coil 152 of the power transmitter 150 of the telephone base 110 when the wireless handset 120 is in sufficient proximity to the charging position on the telephone base 110. When this occurs, the power transmitter 150 of the telephone base 110 charges the rechargeable battery 164 of the wireless handset 120.

The handset wireless transceiver 162, the handset CPU 166, the handset memory 168, and the handset touch screen display 122 are analogous to the components described above of the telephone base 110. Thus, detailed descriptions of these wireless handset components are omitted for the sake of brevity.

FIG. 2 is not meant to be exhaustive of the components of the desktop telephone 100. Additional components such as a speaker, a microphone, a camera, are also present as is known in the art. Moreover, the telephone base 110 and/or the wireless handset 120 may have voice-control capabilities.

Various components of the power transmitter 150 and the power receiver 170 of the desktop telephone 100 are now described with reference to FIG. 3.

The power transmitter 150 includes the charging coil 152, a power transmitter controller 154, and a power transmitter wireless transceiver (Tx/Rx) 159. The power receiver 170 includes the receiving coil 172, the power receiver controller 174, and a power receiver wireless transceiver (Tx/Rx) 179. The power transmitter controller 154 includes a power transmitter processor 156 and a power transmitter memory 158. The power receiver controller 174 includes a power receiver processor 176 and a power receiver memory 178. The power transmitter processor 156 may be a CPU or digital signal processor that executes instructions based on one or more programs stored in the power transmitter memory 158. Likewise, the power receiver processor 176 may be a CPU or digital signal processor that executes instructions based on one or more programs stored in the power receiver memory 178. Alternatively, the power transmitter controller 154 and power receiver controller 174 may take the form of digital logic gates in a programmable gate array, and/or fixed digital logic in a fixed gate array. Further still, the power transmitter controller 154 and power receiver controller 174 may be embodied in one or more ASICs. Regardless of the particular form they may take, the power transmitter 150 and power receiver 170 may be configured to perform wireless charging operations as part of a wireless charging protocol, for example.

The power transmitter wireless transceiver 159 and the power receiver wireless transceiver 179 perform wireless communications to exchange messages according to a wireless charging protocol, as described in more detail below. The power transmitter wireless transceiver 159 and the power receiver wireless transceiver 179 each may include a radio frequency (RF) transceiver and modem that modulates messages sourced by the respective controller to be transmitted and demodulates received messages that are provided to the respective controller.

As shown at 302, power is transferred from the charging coil 152 of the power transmitter 150 to the receiving coil 172 of the power receiver 170.

At 304, the power transmitter 150 and the power receiver 170 exchange control signals (messages in a form of packets, for example) via an information communication interface 306 established between the power transmitter 150 and the power receiver 170 using the power transmitter wireless transceiver 159 and the power receiver wireless transceiver 179. The information communication interface 306 consists of a set of message exchanges that carry control and other information used by the wireless power charging protocol. This information communication interface 306 is leveraged to serve as an OOB channel to exchange information associated with secure pairing of the telephone base 110 with the wireless handset 120, as described further below.

In one embodiment, wireless power charging may be controlled according to a wireless power charging protocol, such as the WPC Qi protocol.

Figure 3:
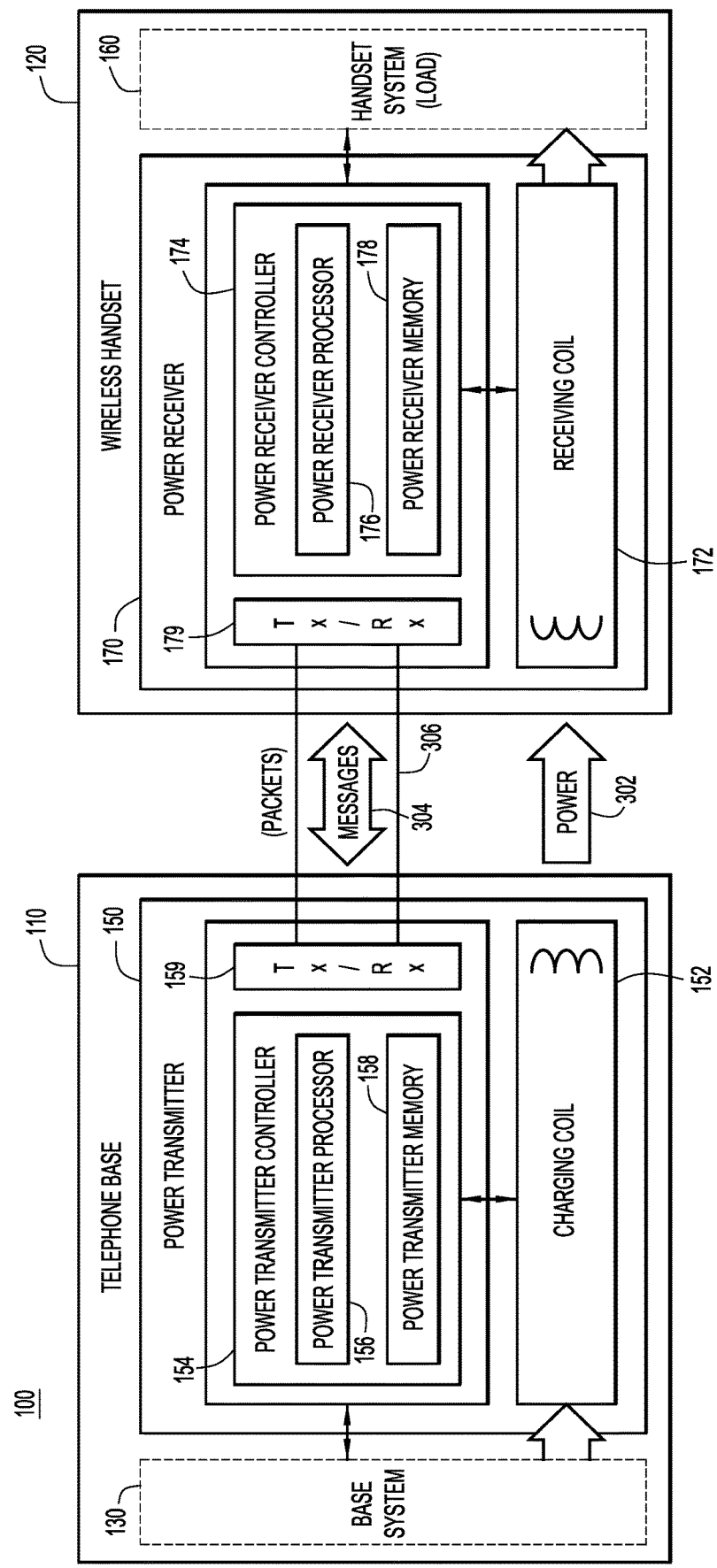
FIG. 3 is a more detailed block diagram illustrating interaction between a power transmitter of the telephone base and a power receiver of the wireless handset to enable wireless charging and secure pairing, according to an example embodiment.
Figure 4:
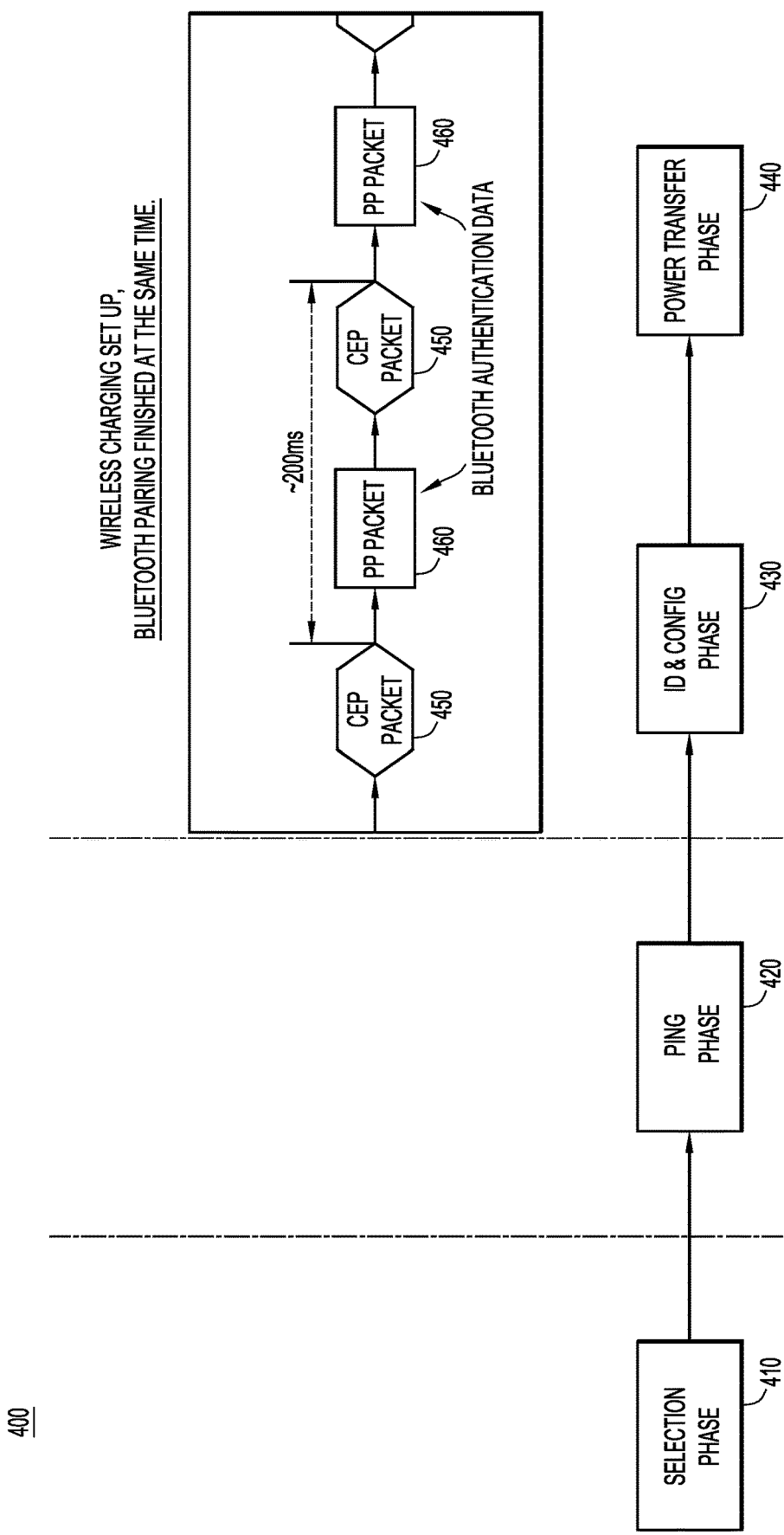
FIG. 4 is an operational flow diagram illustrating a method of exchanging pairing related information through signaling performed according to a wireless charging protocol between the power transmitter of the telephone base and the power receiver of the wireless handset depicted in FIG. 3, according to an example embodiment.

FIG. 4 is an operational flow diagram illustrating a method 400 of exchanging pairing related information through signaling performed according to a wireless charging protocol between the power transmitter 150 and the power receiver 170 depicted in FIG. 3, according to an example embodiment. Reference is also made to FIGS. 1A, 1B, 2 and 3 for purposes of this description.

The WPC Qi protocol includes four phases: (1) a selection phase 410, (2) a ping phase 420, (3) an identification and configuration phase 430, and (4) a power transfer phase 440.

Selection phase 410. During the selection phase, the power transmitter 150, under the control of the power transmitter controller 154, monitors the interface surface to detect presence and/or absence of an object(s) in the charging position 114 of the telephone base. The object may be the wireless handset 120 or another device. The power transmitter 150 detects the presence of the object in the charging position 114 when the object is powered on. For example, a change in capacitance or resonance of the charging coil 152 is detected. When the power transmitter 150 detects the object, electromagnetic coupling between the power transmitter 150 and the power receiver 170 is performed/achieved. The electromagnetic coupling triggers the ping phase 420 and the identification and configuration phase 430 in which the object is validated and various packets are exchanged via the information communication interface 306. In an example embodiment, the selection phase 410 is only performed when no device is detected on the interface surface of the power transmitter 150. The selection phase 410 is used for monitoring and detecting the object, such as the wireless handset 120, placed on the interface surface. When the object is placed on the interface surface of the power transmitter 150, the selection phase 410 ends and is not activated again while the object remains on the interface surface of the power transmitter 150.

Ping phase 420. During the ping phase 420, the power transmitter 150 establishes the information communication interface 306 with the power receiver 170. The power transmitter 150 transmits a digital ping (in a form of a control packet) to the power receiver 170 via the established information communication interface 306, and waits for a response from the power receiver 170. If the power transmitter 150 discovers the power receiver 170 (receives the response at a signal strength above a predetermined threshold), the power transmitter 150 extends the ping phase 420 by periodically transmitting the digital ping. Based on receiving the response (in a form of a packet), the power transmitter 150 also transitions to the identification and configuration phase 430.

Identification and Configuration Phase 430. During the identification and configuration phase 430, the power transmitter 150 obtains identification information of the object (e.g., the wireless handset 120) and configuration information, such as the maximum amount of power that the power receiver 170 intends to provide at its output. Also, at least part of the information for the secure wireless pairing of the telephone base 110 with the wireless handset 120 may be exchanged using the information communication interface 306. Based on the configuration information, the power transmitter 150 enters the power transfer phase 440.

Power Transfer Phase 440. In this power transfer phase 440, wireless charging is performed whereby the charging coil 152 provides power to the receiving coil 172 based on the configuration information obtained during the identification and configuration phase 430. During the power transfer phase 440, the information communication interface 306 is supported (set up and remains available). The information communication interface 306 provides feedback on charging and is utilized to exchange some of the information required for the secure pairing.

According to one example embodiment, the WPC Qi Protocol defines Control Error Packets (CEP) 450 and the Proprietary Packets (PPP) 460 are exchanged between the power transmitter 150 and the power receiver 170 via the information communication interface 306 during the identification and configuration phase 430 and the power transfer phase 440.

The CEP 450, from the power receiver 170 to the power transmitter 150, inform of the charging status and whether the power receiver 170 is still present. The CEP 450, from the power transmitter 150 to the power receiver, provide status information and adjustments to charging conditions. The CEP 450 are transmitted at an interval of 200 milliseconds (ms).

The PPP 460 are defined for developers to exchange private and user-defined information between the power transmitter 150 and the power receiver 170. The PPP 460 are transmitted during the 200 ms interval and may be used to include at least some of authentication information for establishing secure wireless communication pairing, according to the techniques presented herein.

In one example embodiment, the secure wireless communication pairing, such as secure Bluetooth paring, is established while the wireless charging is being set up. For example, the secure wireless communication pairing is established at approximately the same time that the wireless charging is being set up. The authentication information exchange for the secure pairing may be completed during the identification and configuration phase 430.

Specifically, there are different types and sizes of the PPP 460 defined by the WPC Qi protocol. For example, the size of the PPP 460 may be up to 20 bytes and the information transfer bit rate of wireless charging is 2 KHz. On the other hand, typically, the Bluetooth MAC address of the wireless handset 120 is 48 bits and cryptographic information may include a random value r that is 128 bits. Accordingly, in one embodiment, Bluetooth authentication data that includes the Bluetooth MAC address and the cryptographic information is transmitted in one or more PPP 460 in about 150 ms (in one interval between the CEP 450).

In various example embodiments, the information communication interface 306 of the wireless charging protocol is the OOB channel for the Stage 3 of the SSP (Authentication Stage I. In one example embodiment, the information communication interface 306 is also used to perform Stage 2 of the SSP (the Public Key Exchange Stage).

These are but some example embodiments. The duration of establishing the secure wireless communication pairing, the number and size of the PPP 460, and amount of pairing information transmitted in the PPP 460 varies depending on a particular configuration and use case scenario.

Figure 5:
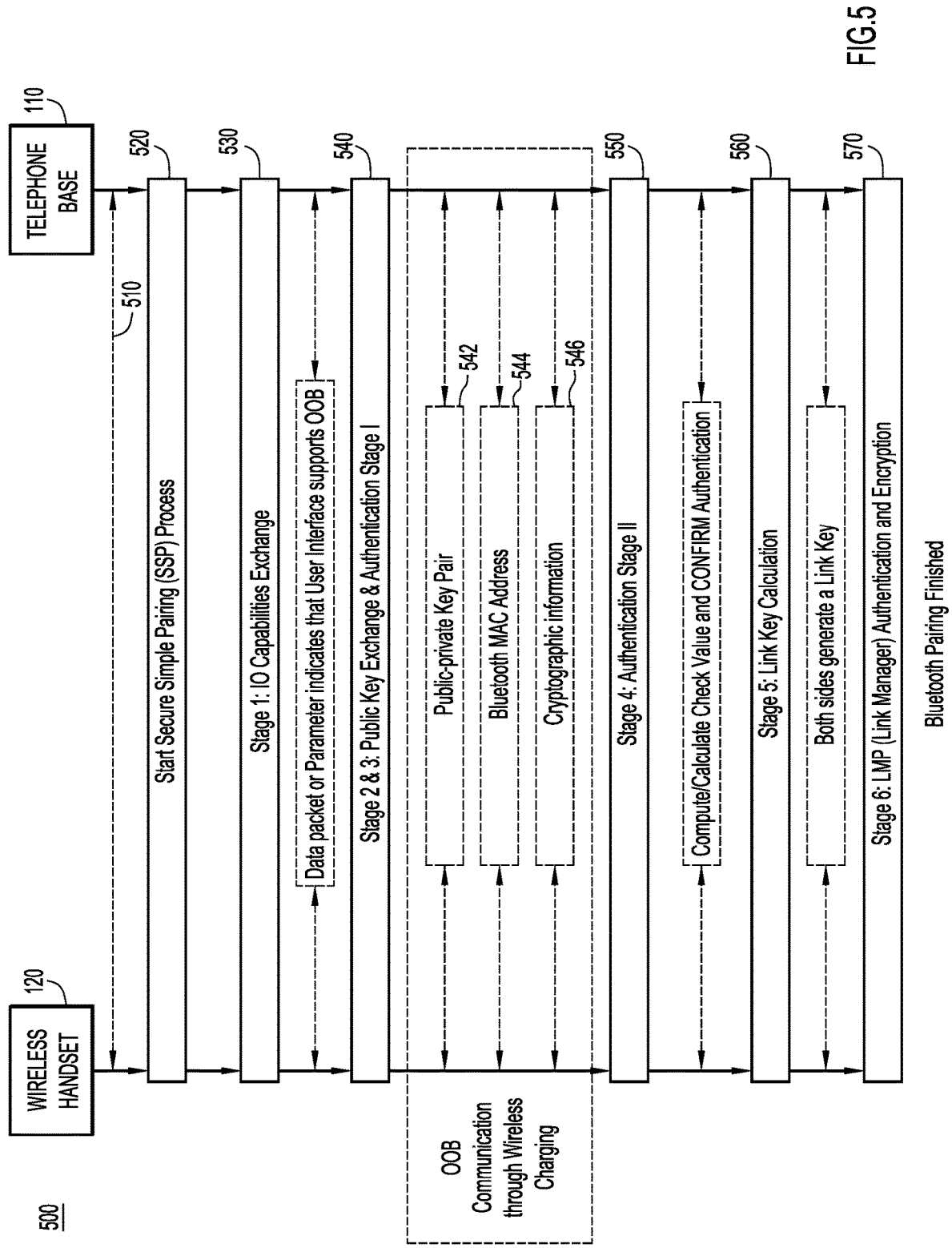
FIG. 5 is a sequence diagram illustrating a method of securely pairing the wireless handset with the telephone base at least partially through signaling performed according to a wireless charging protocol between the power transmitter and the power receiver depicted in FIG. 3, according to an example embodiment.

Reference is now made to FIG. 5. FIG. 5 is a sequence diagram illustrating a method 500 of securely pairing the wireless handset with the telephone base at least partially through signaling performed according to a wireless charging protocol between the power transmitter and the power receiver depicted in FIG. 3, according to an example embodiment. Reference is also made to FIGS. 1A, 1B, 2, 3, and 4 in connection with the description of FIG. 5.

In FIG. 5, the wireless handset 120 is the wireless charging receiving device, as described above and is also a Bluetooth initiating device. The telephone base 110 is a wireless charging transmitting device and a Bluetooth non-initiating device.

In the method 500, at 510, the wireless handset 120 is placed at the charging position 114 on the telephone base 110. The telephone base 110 detects presence of the wireless handset 120 using the power transmitter 150 and proceeds to the ping phase of the wireless charging protocol that is being performed at the same time as the SSP.

At 520, the wireless handset 120 initiates the SSP process. For example, the wireless handset 120 may send a pairing request to the telephone base 110 and receive a pairing response from the telephone base 110. These request(s) and response(s) are transmitted using the base wireless transceiver 140 of the telephone base 110 and the handset wireless transceiver 162 of the wireless handset 120. In short, the SSP is initiated using a short-range communication protocol, such as the Bluetooth wireless protocol.

At 530, the wireless handset 120 and the telephone base 110 exchange input and output capabilities, as explained above in Stage 1 of SSP. The input and output capabilities transmitted in data packets or as parameters indicate support for using the information communication interface 306 as the OOB channel for at least Stage 1 authentication. The input and output capabilities are exchanged using the base wireless transceiver 140 and the handset wireless transceiver 162.

Based on indicating support for using the information communication interface 306 of the wireless charging protocol as the OOB channel, at 540, the next two stages of the SSP (the public key exchange and the authentication stage I) are performed through the wireless charging protocol using the information communication interface 306.

Specifically, at 542, the power transmitter 150 of the telephone base 110 and the power receiver 170 of the wireless handset 120 perform an Elliptic-Curve Diffie-Hellman (ECDH) key exchange. The ECDH public and private key pair is exchanged to allow for encrypted communication. At 544, the power receiver 170 provides to the power transmitter 150, identification information such as a Bluetooth MAC address. At 546, the power transmitter 150 and the power receiver 170 exchange cryptographic information.

The values exchanged in operations 542-546 ensure that the telephone base 110 and the wireless handset 120 can acknowledge each other and calculate an exclusive check value to proceed to the next state. These values of operations 542-546 are exchanged in PPP 460 and may be performed within one 200 ms interval. From the user's perspective, the wireless handset 120 is simply placed in the charging position 114 for the secure pairing to occur. The identification information (Bluetooth MAC) address and authentication information (and optionally keys) are exchanged automatically and initialized based on the configuration of the firmware.

The public-private keys, identification information, and the cryptographic information obtained in operations 542, 544, and 546, respectively, are provided to the base CPU 132 and the handset CPU 166. The remaining stages of the SSP (SSP stages 4-6), operations 550, 560, and 570 are performed using the short-range communication channel (e.g., the Bluetooth wireless communication) between the base wireless transceiver 140 and the handset wireless transceiver 162.

Specifically, at 550, based on the information obtained in operation 540, the telephone base 110 and the wireless handset 120 compute and calculate a check value to confirm authentication (Stage 4 of the SSP). At 560, the telephone base 110 and the wireless handset 120 generate a link key that may be computed using the shared key and public key exchanged at 542. At 570, LMP authentication and encryption are performed in which encryption keys are generated and the telephone base 110 and the wireless handset 120 are successfully and securely paired or connected.

Accordingly, the entire wireless communication pairing may be successfully completed within approximately one second and the process is simplified to maybe just one-click "connect" on the base touch screen display 112. Fast and secure pairing under the framework of the OOB protocol is ensured.

The techniques presented above improve the user experience. With the fast and secure pairing, no calls are missed and the process is further simplified to one button click or no button clicks depending on a particular configuration. Moreover, no additional hardware components are required to implement these techniques.

The security of the pairing process is further improved by preventing MITM attacks because the wireless charging requires a very short distance (within 15 mm) and the authentication information and/or the public keys are exchanged within this distance. Broadcasting and listening/inquiring is no longer needed, which means the attackers are not able to intercept the secure pairing process. Since the pairing is secure, user's data is protected. In summary, the techniques presented above provide a user-friendly (with minimum human-interaction) secure, and fast pairing at no additional cost.

In various example embodiments, terms such as "transmit" and "receive" are broadly used herein to refer to techniques for providing and obtaining data and/or signals.

Figure 6:
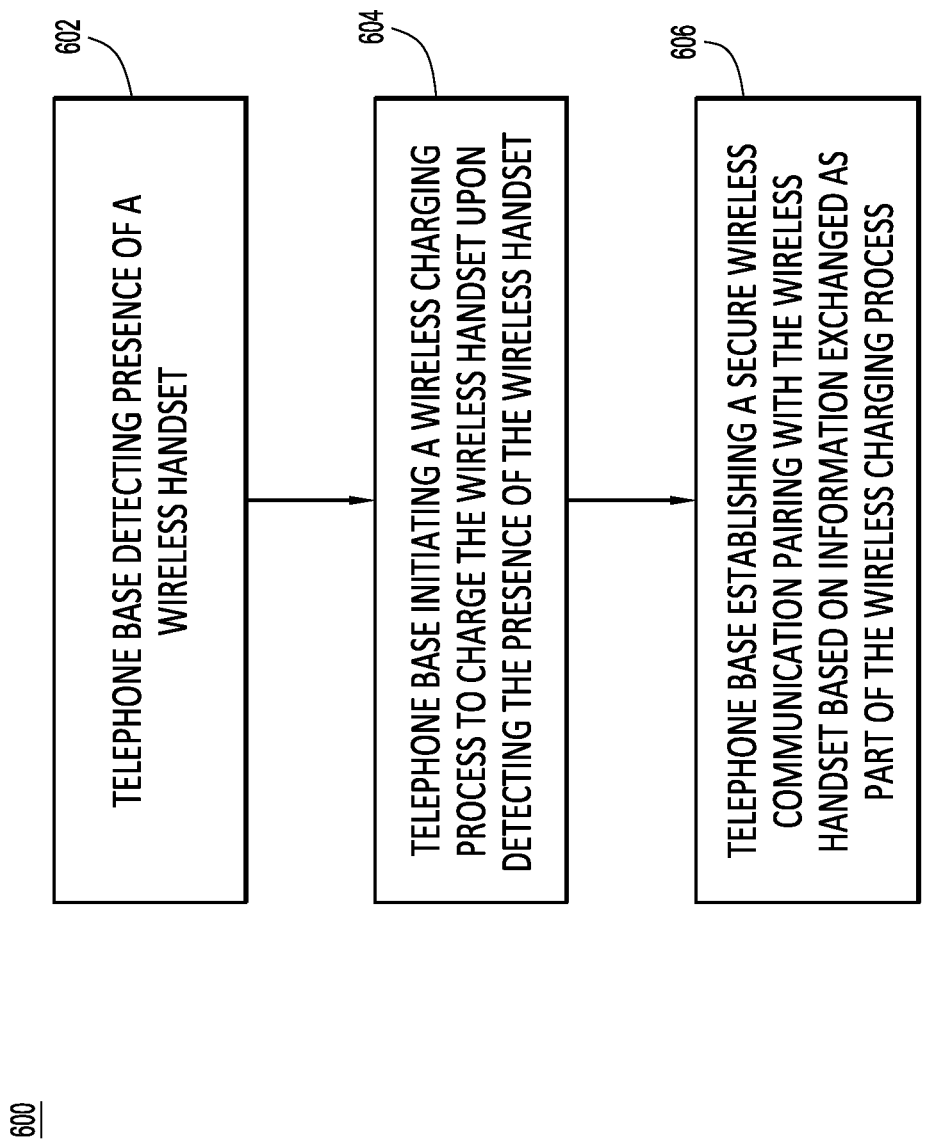
FIG. 6 is a flow diagram illustrating a method of performing secure pairing of the wireless handset to the telephone base based on signaling during wireless charging operations, according to various example embodiments.

Turning now to FIG. 6, a flowchart is described of a method 600 for establishing a secure wireless communication pairing with the wireless handset based on information exchanged as part of the wireless charging process, according to various example embodiments. The method 600 is performed by an apparatus e.g., the telephone base 110 shown in FIGS. 1A, 1B, 2, 3, and 5.

At 602, the method 600 involves the telephone base detecting presences of a wireless handset.

At 604, when the presence of the wireless handset is detected, the method 600 includes the telephone base initiating a wireless charging process to charge the wireless handset.

At 606, the method 600 involves the telephone base establishing a secure wireless communication pairing with the wireless handset based on information exchanged as part of the wireless charging process.

In the method 600, the operation 606 of establishing the secure wireless communication pairing may include the telephone base exchanging, with the wireless handset, pairing capabilities in which support is indicated for an authentication via an out-of-band channel. The wireless charging process is used as the out-of-band channel for secure wireless communication pairing between the wireless handset and the telephone base.

In one form, the information includes one or more of encryption keys, address information, and cryptographic information. The operation 606 of establishing the secure wireless communication pairing may further include the power transmitter exchanging the information with a power receiver of the wireless handset when the pairing capabilities indicate support for the authentication via the out-of-band channel.

According to one or more example embodiments, the operation 602 of detecting the presence of the wireless handset may include a power transmitter of the telephone base detecting that a power receiver of the wireless handset is in a charging position of the telephone base. The operation 604 of initiating the wireless charging process may include establishing an information communication interface, according to a wireless charging protocol, between the power transmitter and the power receiver, for the wireless charging process of the wireless handset. The information is then exchanged via the information communication interface of the wireless charging process.

In another form, the method 600 may further include a power transmitter of the telephone base exchanging signals with a power receiver of the wireless handset, via an information communication interface established during wireless charging of the wireless handset. These signals may include the information, such as one or more of encryption information, address information, and cryptographic information.

In the method 600, during an identification and configuration phase or a power transfer phase of the wireless charging process, the power transmitter may exchange with the power receiver, signals that include one or more control error packets related to a status of the wireless charging process and that include one or more proprietary packets with the information contained therein.

According to one or more example embodiments, the wireless charging process may be performed using a Wireless Power Consortium (WPC) Qi protocol and the secure wireless communication pairing may be according to a Bluetooth wireless communication protocol.

In still another example embodiment, an apparatus is provided. The apparatus is a telephone base 110. The apparatus includes a wireless transceiver configured to perform a short-range wireless communication with a wireless handset and a memory configured to store information. The apparatus may further include a charging position on a surface of a housing and a power transmitter positioned proximate the charging position. The power transmitter is configured to wirelessly provide power to a power receiver of the wireless handset to charge a rechargeable battery of the wireless handset when the wireless handset is in the charging position. The apparatus further includes a processor that is coupled to the wireless transceiver and the power transmitter. The processor is configured to perform various operations. The operations include detecting presence of the wireless handset and initiating a wireless charging process to charge the wireless handset when the presence of the wireless handset is detected. The operations further include establishing a secure wireless communication pairing with the wireless handset based on the information exchanged as part of the wireless charging process.

In one form, the processor may be configured to perform the operation of establishing the secure wireless communication pairing by exchanging, via the wireless transceiver with the wireless handset, pairing capabilities in which support is indicated for an authentication via an out-of-band channel. The out-of-band channel is used for the wireless charging process.

According to one or more example embodiments, the information may include one or more of encryption keys, address information, and cryptographic information. The processor may be configured to perform the operation of establishing the secure wireless communication pairing by exchanging the information, by the power transmitter with the power receiver of the wireless handset when the pairing capabilities indicate support for the authentication via the out-of-band channel.

The processor may be configured to perform the operation of detecting the presence of the wireless handset by the power transmitter detecting that the power receiver of the wireless handset is in the charging position. Additionally, the processor may be configured to perform the operation of initiating the wireless charging process by establishing an information communication interface, according to a wireless charging protocol, between the power transmitter and the power receiver, for the wireless charging process of the wireless handset. The information may then be exchanged via the information communication interface.

In yet another form, the power transmitter may further be configured to exchange signals with the power receiver of the wireless handset, via an information communication interface established during wireless charging of the wireless handset. The signals include the information that is one or more of encryption information, address information, and cryptographic information.

According to one or more example embodiments, the power transmitter may be configured to exchange the signals by exchanging, in the signals, one or more control error packets related to a status of the wireless charging process and one or more proprietary packets that include the information. These packets are exchanged during an identification and configuration phase or a power transfer phase of the wireless charging process.

According to one or more example embodiments, the wireless charging process may be performed using a Wireless Power Consortium (WPC) Qi protocol and the secure wireless communication may be according to a Bluetooth wireless communication protocol.

In yet another example embodiment, a telephone such as the desktop telephone 100 is provided. The telephone includes a wireless handset and a telephone base. The wireless handset includes a handset wireless transceiver, a rechargeable battery, and a power receiver configured to charge the rechargeable battery. The telephone base includes a base wireless transceiver configured to wirelessly communicate with the handset wireless transceiver and a memory configured to store information. The telephone base further includes a charging position on a surface of a housing and a power transmitter positioned proximate the charging position. The power transmitter is configured to wirelessly provide power to the power receiver to charge the rechargeable battery when the wireless handset is in the charging position. The telephone base further includes a processor coupled to the base wireless transceiver and the power transmitter. The processor is configured to perform operations including detecting presence of the wireless handset and initiating a wireless charging process to charge the wireless handset when the presence of the wireless handset is detected. The operations further include establishing a secure wireless communication pairing with the wireless handset based on information exchanged as part of the wireless charging process.

According to one or more example embodiments, the processor may be configured to perform the operation of establishing the secure wireless communication pairing by exchanging, via the base wireless transceiver with the handset wireless transceiver, pairing capabilities in which support is indicated for an authentication via an out-of-band channel. The out-of-band channel is used for the wireless charging process.

In one form, the information may include one or more of encryption keys, address information, and cryptographic information. The processor may further be configured to perform the operation of establishing the secure wireless communication pairing by exchanging the information by the power transmitter with the power receiver based on the pairing capabilities indicating support for the authentication via the out-of-band channel.

The processor may further be configured to perform the operation of detecting the presence of the wireless handset by having the power transmitter detect that the power receiver of the wireless handset is in the charging position. Also, the processor may be configured to perform the operation of initiating the wireless charging process by establishing an information communication interface, according to a wireless charging protocol, between the power transmitter and the power receiver, for the wireless charging process of the wireless handset. The information is then exchanged via the information communication interface.

In yet another form, the power transmitter may further be configured to exchange signals with the power receiver, via an information communication interface established during wireless charging of the wireless handset. The signals have the information that includes one or more of encryption information, address information, and cryptographic information.

According to one or more example embodiments, the power transmitter may be configured to exchange the signals by exchanging, in these signals, one or more control error packets related to a status of the wireless charging process and one or more proprietary packets that include the information. These packets are exchanged during an identification and configuration phase or a power transfer phase of the wireless charging process.

The embodiments presented may be in other various other forms, such as a system or a computer program product. The computer program product may include a computer readable storage medium (or media) having computer readable program instructions thereon for causing a telephone or a telephone base to carry out aspects presented herein.

The programs described herein (e.g., control logic) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage and/or memory elements(s) can store data, software, code, instructions (e.g., processor instructions), logic, parameters, combinations thereof, and/or the like used for operations described herein. This includes the storage and/or memory elements(s) being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., keyboard, keypad, etc.). The interface screens may include any suitable actuators (e.g., links, tabs, etc.) to navigate between the screens in any fashion.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   detecting, by a telephone base, presence of a wireless handset;
   initiating a wireless charging process to charge the wireless handset upon detecting the presence of the wireless handset; and
   establishing a secure wireless communication pairing by the telephone base with the wireless handset, based on information exchanged as part of the wireless charging process via an out-of-band communication channel that is a data communication channel of a wireless charging protocol for communication between a power transmitter of the telephone base and a power receiver of the wireless handset.

2. The method of claim 1, wherein establishing the secure wireless communication pairing includes:
   exchanging, by the telephone base with the wireless handset, pairing capabilities in which support is indicated for authentication via the out-of-band communication channel, wherein the wireless charging process is used for the out-of-band communication channel.

3. The method of claim 2, wherein the information includes one or more of encryption keys, address information, and cryptographic information, and establishing the secure wireless communication pairing further includes:
   based on the pairing capabilities indicating support for the authentication via the out-of-band communication channel, exchanging the information, by the power transmitter of the telephone base with the power receiver of the wireless handset.

4. The method of claim 1, wherein detecting the presence of the wireless handset further includes:
   detecting, by the power transmitter of the telephone base, that the power receiver of the wireless handset is in a charging position of the telephone base, and
   wherein initiating the wireless charging process includes:
      establishing an information communication interface, according to the wireless charging protocol, between the power transmitter and the power receiver, for the wireless charging process of the wireless handset, wherein the information is exchanged via the information communication interface of the wireless charging protocol.

5. The method of claim 1, further comprising:
   exchanging signals, by the power transmitter of the telephone base with the power receiver of the wireless handset, via an information communication interface established during wireless charging of the wireless handset, wherein the signals include the information comprising one or more of encryption information, address information, and cryptographic information.

6. The method of claim 5, wherein exchanging the signals further includes:
   exchanging, during an identification and configuration phase or a power transfer phase of the wireless charging process, by the power transmitter with the power receiver, one or more control error packets related to a status of the wireless charging process and one or more proprietary packets that include the information.

7. The method of claim 1, wherein the wireless charging process is performed using the wireless charging protocol that includes a Wireless Power Consortium (WPC) Qi protocol and wherein the secure wireless communication pairing is according to a Bluetooth wireless communication protocol.

8. The method of claim 1, wherein the telephone base further comprises a base wireless transceiver that facilitates wireless communication with the wireless handset using a short-range wireless communication protocol, and the power transmitter includes a power transmitter wireless transceiver that communicates using the wireless charging protocol.

9. An apparatus comprising:
   a wireless transceiver configured to perform a short-range wireless communication with a wireless handset;
   a memory configured to store information;
   a charging position on a surface of a housing;
   a power transmitter positioned proximate the charging position, and configured to wirelessly provide power to a power receiver of the wireless handset to charge a rechargeable battery of the wireless handset when the wireless handset is in the charging position; and
   a processor coupled to the wireless transceiver and the power transmitter and configured to perform operations comprising:
      detecting presence of the wireless handset in the charging position;
      initiating a wireless charging process to charge the wireless handset upon detecting the presence of the wireless handset in the charging position; and
      establishing a secure wireless communication pairing with the wireless handset, based on the information exchanged as part of the wireless charging process via an out-of-band communication channel that is a data communication channel of a wireless charging protocol for communication between the power transmitter of the apparatus and the power receiver of the wireless handset.

10. The apparatus of claim 9, wherein the processor is configured to perform the operation of establishing the secure wireless communication pairing by:
    exchanging, via the wireless transceiver with the wireless handset, pairing capabilities in which support is indicated for authentication via the out-of-band communication channel, wherein the wireless charging process is used as the out-of-band communication channel.

11. The apparatus of claim 10, wherein the information includes one or more of encryption keys, address information, and cryptographic information, and wherein the processor is configured to perform the operation of establishing the secure wireless communication pairing by:
    based on the pairing capabilities indicating support for the authentication via the out-of-band communication channel, exchanging the information, by the power transmitter with the power receiver of the wireless handset.

12. The apparatus of claim 9, wherein the processor is configured to perform the operation of initiating the wireless charging process by establishing an information communication interface, according to the wireless charging protocol, between the power transmitter and the power receiver, for the wireless charging process of the wireless handset, wherein the information is exchanged via the information communication interface.

13. The apparatus of claim 9, wherein the power transmitter is further configured to exchange signals with the power receiver of the wireless handset, via an information communication interface established during wireless charging of the wireless handset, wherein the signals include the information comprising one or more of encryption information, address information, and cryptographic information.

14. The apparatus of claim 13, wherein the power transmitter is configured to exchange the signals by exchanging, during an identification and configuration phase or a power transfer phase of the wireless charging process, one or more control error packets related to a status of the wireless charging process and one or more proprietary packets that include the information.

15. The apparatus of claim 9, wherein the wireless charging process is performed using the wireless charging protocol that includes a Wireless Power Consortium (WPC) Qi protocol and wherein the secure wireless communication pairing is according to a Bluetooth wireless communication protocol.

16. A telephone comprising:
  a wireless handset that includes:
    a handset wireless transceiver,
    a rechargeable battery, and
    a power receiver configured to charge the rechargeable battery; and
  a telephone base that includes:
    a base wireless transceiver configured to wirelessly communicate with the handset wireless transceiver,
    a memory configured to store information,
    a charging position on a surface of a housing,
    a power transmitter positioned proximate the charging position, and configured to wirelessly provide power to the power receiver in order to charge the rechargeable battery when the wireless handset is in the charging position, and
    a processor coupled to the base wireless transceiver and the power transmitter and configured to perform operations comprising:
      detecting presence of the wireless handset in the charging position;
      initiating a wireless charging process to charge the wireless handset upon detecting the presence of the wireless handset in the charging position; and
      establishing a secure wireless communication pairing with the wireless handset, based on information exchanged as part of the wireless charging process via an out-of-band communication channel that is a data communication channel of a wireless charging protocol for communication between the power transmitter of the telephone base and the power receiver of the wireless handset.

17. The telephone of claim 16, wherein the processor is configured to perform the operation of establishing the secure wireless communication pairing by:
  exchanging, via the base wireless transceiver with the handset wireless transceiver, pairing capabilities in which support is indicated for authentication via the out-of-band communication channel, wherein the wireless charging process is used for the out-of-band communication channel.

18. The telephone of claim 17, wherein the information includes one or more of encryption keys, address information, and cryptographic information, and wherein the processor is configured to perform the operation of establishing the secure wireless communication pairing by:
  based on the pairing capabilities indicating support for the authentication via the out-of-band communication channel, exchanging the information, by the power transmitter with the power receiver.

19. The telephone of claim 16, wherein the processor is configured to perform the operation of initiating the wireless charging process by establishing an information communication interface, according to the wireless charging protocol, between the power transmitter and the power receiver, for the wireless charging process of the wireless handset, wherein the information is exchanged via the information communication interface.

20. The telephone of claim 16, wherein the power transmitter is further configured to exchange signals with the power receiver, via an information communication interface established during wireless charging of the wireless handset, wherein the signals include the information comprising one or more of encryption information, address information, and cryptographic information.

* * * * *